United States Patent
Uchiyama et al.

(10) Patent No.: US 10,483,559 B2
(45) Date of Patent: Nov. 19, 2019

(54) POWER GENERATOR

(71) Applicant: ATSUMITEC CO., LTD., Takaokanishi, Naka-ku, Hamamatsu-shi, Shizuoka (JP)

(72) Inventors: Naoki Uchiyama, Shizuoka (JP); Yasuyuki Uchiyama, Shizuoka (JP); Seigou Nakabayashi, Shizuoka (JP)

(73) Assignee: KABUSHIKI KAISHA ATSUMITEC, Shizuoka (JP)

( * ) Notice: Subject to any disclaimer, the term of this patent is extended or adjusted under 35 U.S.C. 154(b) by 277 days.

(21) Appl. No.: 14/780,416

(22) PCT Filed: Mar. 7, 2014

(86) PCT No.: PCT/JP2014/055990
§ 371 (c)(1),
(2) Date: Sep. 25, 2015

(87) PCT Pub. No.: WO2014/156566
PCT Pub. Date: Oct. 2, 2014

(65) Prior Publication Data
US 2016/0056481 A1   Feb. 25, 2016

(30) Foreign Application Priority Data
Mar. 26, 2013 (JP) .................. 2013-064202

(51) Int. Cl.
*H01M 8/02* (2016.01)
*H01M 8/24* (2016.01)
(Continued)

(52) U.S. Cl.
CPC ....... *H01M 8/0247* (2013.01); *H01M 8/2465* (2013.01); *H01M 2300/0082* (2013.01)

(58) Field of Classification Search
CPC ... H01M 8/023; H01M 8/0232; H01M 8/0247
See application file for complete search history.

(56) References Cited

U.S. PATENT DOCUMENTS 5,518,839 A * 5/1996 Olsen .................... H01M 4/661
                                                    429/231.3
2003/0124413 A1   7/2003 Bai et al.
2003/0170544 A1   9/2003 Jacobson et al.

FOREIGN PATENT DOCUMENTS

JP   2000156239 A      6/2000
JP   2001057215 A *    2/2001
(Continued)

OTHER PUBLICATIONS

Translation of JP 2001-057215A.*
(Continued)

*Primary Examiner* — Osei K Amponsah
(74) *Attorney, Agent, or Firm* — Kinney & Lange, P.A.

(57) ABSTRACT

A power generator 1 includes: a fuel electrode 5 that receives a supply of fuel gas; an air electrode 6 that receives a supply of air; an electrolyte layer 7 disposed in between the fuel electrode 5 and the air electrode 6; a gas flow channel 3 that circulates therein the fuel gas or the air, with the fuel electrode 5 or the air electrode 6 being exposed to at least part of the gas flow channel 3; a porous body 8 filled in the gas flow channel 3; and a porous sheet 9 present in contact with the porous body 8 and the fuel electrode 5 or the air electrode 6, the porous sheet 9 being made of a material having electrical conductivity, the material having pores formed to spread in a uniform manner, the pores being larger in diameter than pores formed in the porous body 8.

3 Claims, 4 Drawing Sheets

(51) Int. Cl.
*H01M 8/0247* (2016.01)
*H01M 8/2465* (2016.01)

(56) References Cited

FOREIGN PATENT DOCUMENTS

| | | | |
|---|---|---|---|
| JP | 2005513721 | A | 5/2005 |
| JP | 2007273195 | A | 10/2007 |
| JP | 2009245897 | A | 10/2009 |
| JP | 2010009823 | A | 1/2010 |
| JP | 2012133961 | A | 7/2012 |
| WO | 2012117035 | A1 | 9/2012 |
| WO | 2014156566 | A1 | 10/2014 |

OTHER PUBLICATIONS

Extended European Search Report dated Aug. 17, 2016, for corresponding European Application No. 14776156.3.
International Search Report in PCT Application No. PCT/JP2014/055990, PCT Written Opinion of the International Searching Authority in PCT/JP2014/055990, dated Apr. 8, 2014.

\* cited by examiner

A - A

B - B

POWER GENERATOR

FIELD BACKGROUND

The present invention relates to a power generator that generates power by supplying fuel gas to the fuel electrode of a fuel cell.

The fuel cell is made up of a fuel electrode and an air electrode with an electrolyte present therebetween. Power is generated by supplying fuel gas and the like to the fuel cell. A solid oxide fuel cell (SOFC) in particular is structured as an assembly of an electrolyte made of a solid oxide, a fuel electrode (hydrogen pole), and an air electrode (oxygen pole), the electrodes being assembled with the electrolyte through bonding or the like. The solid oxide fuel cell can generate high output power when fuel gas is supplied to the fuel electrode, while air and the like are supplied to the air electrode. The solid oxide fuel cell can use not only hydrogen gas but also a gas containing a large amount of carbon monoxide (e.g., exhaust gas of vehicles, such as automobiles, driven with internal combustion engines) as fuel gas.

Such a solid oxide fuel cell is described in Patent Document 1. In this cell, the fuel electrode and the air electrode are exposed to separate chambers, and hydrogen and oxygen are supplied in these separate chambers. The solid oxide fuel cell, which is structured to receive a supply of fuel and air in a separate manner to cause a reaction, is called a double-chamber type cell. The solid oxide fuel cell, which is structured to receive a supply of fuel and air through the same flow channel to cause a reaction, is called a single-chamber type cell.

In both the above-described solid oxide fuel cells of the double-chamber type and the single-chamber type, a gas flow channel is formed along the electrodes. The flow channel is covered with a wall made of a highly electroconductive material to collect current. However, in the case of using exhaust gas, low-concentration fuel needs to be supplied in a large amount, which necessitates increase in the volume of the gas flow channel. However, when the gas flow channel is enlarged, a contact area of the gas with the electrode decreases, which results in an increased current collection (electric) resistance.

Accordingly, there is known a current collection technology that enlarges a contact area of the fuel while securing a gas flow channel by providing a porous body in the gas flow channel instead of covering the gas flow channel with a wall, the porous body being made of a porous metal or an oxide material (e.g., foaming nickel) having a high electrical conductivity. However, the solid oxide fuel cell generates power by using oxygen in the air and the fuel at high temperatures (for example, 700° C. to 1000° C.). To use oxygen in such high-temperature environments, a material high in oxidation resistance needs to be selected as a porous body. Materials having a high oxidation resistance at high temperatures are expensive and high in specific gravity. As a result, it is difficult to make these materials porous, foamed, and the like.

PRIOR ART DOCUMENT

Patent Document

Patent Document 1: Japanese Patent Application Laid-Open Publication No. 2000-156239

SUMMARY

In consideration of the conventional technology, an object of the present invention is to provide a highly productive power generator that enables a material having a good foamability to be selected as a foamed material that forms a porous body used for securing a gas flow channel and for collecting current.

In order to accomplish the above object and other objects, embodiments of the present invention provide a power generator, including: a fuel electrode that receives a supply of fuel gas; an air electrode that receives a supply of air; an electrolyte layer disposed in between the fuel electrode and the air electrode; a gas flow channel that circulates therein the fuel gas or the air, with the fuel electrode or the air electrode being exposed to at least part of the gas flow channel; a porous body filled in the gas flow channel; and a porous sheet present in contact with the porous body and the fuel electrode or the air electrode, the porous sheet being made of a material having electrical conductivity, the material having pores formed to spread in a uniform manner, the pores being larger in diameter than pores formed in the porous body.

According to embodiments of the present invention, the porous sheet made of a material having electrical conductivity is provided inside the gas flow channel so as to be in contact with the fuel electrode or the air electrode. Therefore, the porous sheet functions as a current collector. This makes it possible to use materials without a current collecting capability as a porous body. The pores included in the porous sheet are larger in diameter than the pores formed in the porous body. Accordingly, even when the porous body is covered with the porous sheet, the circulation of the gas constituted of fuel gas or air is not disturbed. This reduces the restrictions in selection of a foamed material that forms the porous body used for securing the gas flow channel and collecting current. Therefore, a material having a good foamability can be selected, resulting in provision of a highly productive power generator. Moreover, since the pores in the porous sheet have a large diameter, circulation of the gas is not disturbed even when the sheet is oxidized.

DETAILED DESCRIPTION

Figure 1:
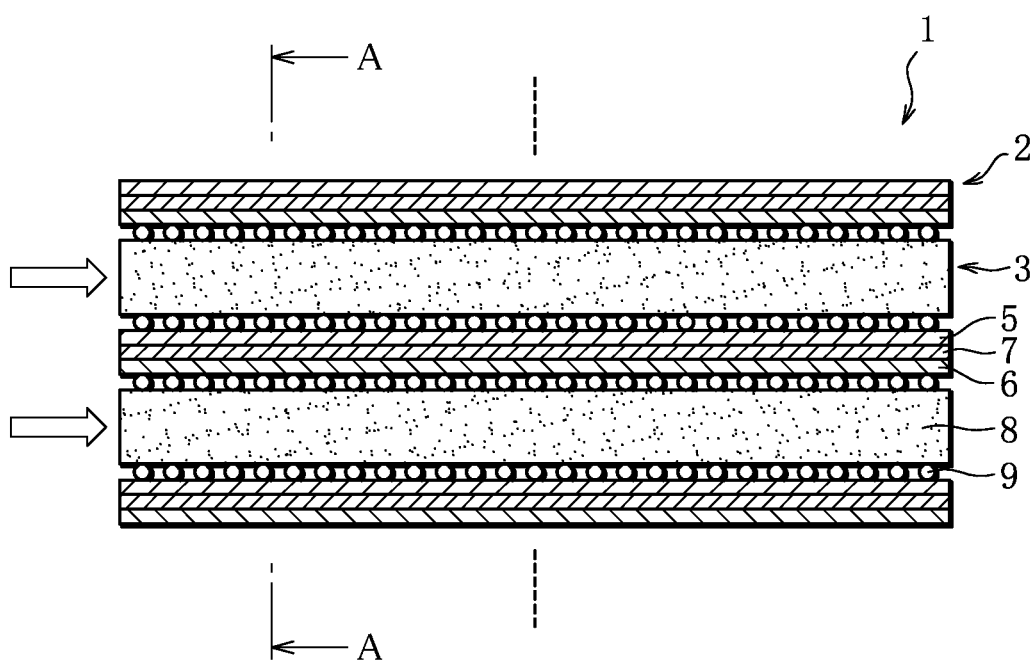
FIG. 1 is a schematic cross sectional view in a longitudinal direction of a power generator according to an embodiment of the present invention.

As illustrated in FIG. 1, the power generator 1 according to an embodiment of the present invention includes fuel cells 2 and gas flow channels 3. The plurality of fuel cells 2 (three fuel cells in the example of FIG. 1) are apposed at intervals, the intervals constituting the gas flow channels 3. In the example of FIG. 1, the fuel cells 2, which are each in a flat plate shape, have side edges each connected to a wall 4. Therefore, the gas flow channel 3 is formed into a tubular shape by the fuel cells 2 in cooperation with the wall 4. The fuel cell 2 includes a fuel electrode 5 and an air electrode 6. The fuel cell 2 also includes an electrolyte layer 7 made of a solid oxide that is closely disposed between the fuel electrode 5 and the air electrode 6. Since the fuel cells 2 are apposed, the fuel electrode 5 of one fuel cell 2 is exposed to the gas flow channel 3, while the air electrode 6 of another fuel cell 2 is exposed to the same gas flow channel 3.

The gas flow channel 3 circulates therein both fuel gas and air (for example, exhaust gas of an automobile) (in an arrow direction in FIG. 1). The fuel gas and the air are supplied to the fuel electrode 5 and the air electrode 6, respectively. More specifically, the air electrode 6 reduces oxygen in the air into oxygen ions. The reduced oxygen ions pass through the electrolyte layer 7 and reacts with hydrogen contained in the fuel gas in the fuel electrode 5, resulting in generation of water. In this case, electrons generated in the fuel electrode 5 move inside a circuit (not illustrated) and ionize the oxygen again in the air electrode 6. At the same time, current passes through the circuit so that power is generated. Thus, oxygen and hydrogen in the gas that passes through the gas flow channel 3 need to be taken in through the fuel electrode 5 and the air electrode 6. Accordingly, the fuel electrode 5 and the air electrode 6 need to be exposed to at least part of the gas flow channel 3. It is preferable that the entire surfaces of the fuel electrode 5 and the air electrode 6 are exposed along the longitudinal direction of the gas flow channel 3, as illustrated in FIG. 1.

As described in the foregoing, the electrolyte layer 7 is formed with a solid oxide in the fuel cell 2, and therefore the fuel cell 2 is a solid oxide fuel cell (SOFC). When exhaust gas is circulated through the gas flow channel 3 in particular, it is preferable to use the SOFC which can withstand high temperatures, can be used without catalyst, and can be downsized due to its high power density. In the case of using exhaust gas, it is preferable to provide a fuel modifier upstream from the fuel electrode 5. This fuel modifier is to convert hydrocarbon, water, and the like in the exhaust gas into hydrogen to enhance hydrogen concentration.

Figure 2:
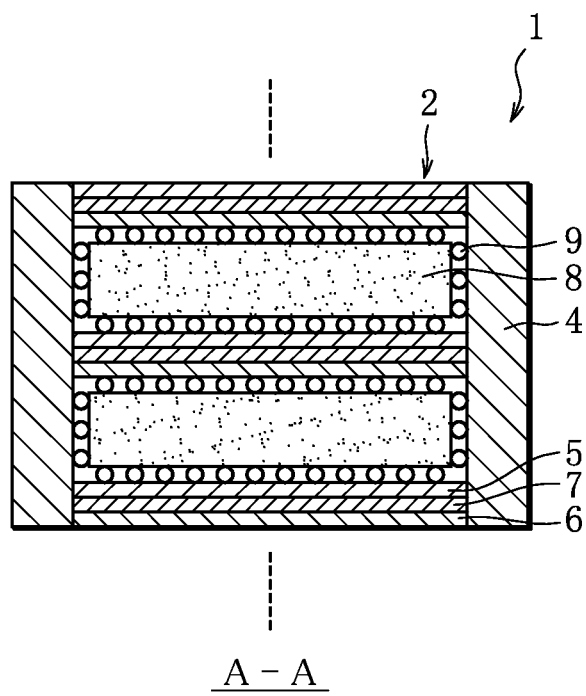
FIG. 2 is a cross sectional view of FIG. 1 taken along A-A line.
Figure 3:
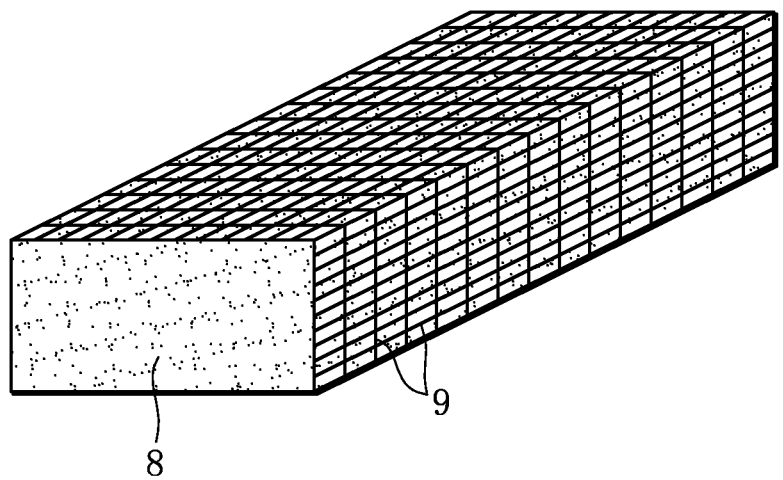
FIG. 3 is a schematic view of a porous body and a porous sheet.

In this example, the gas flow channel 3 is filled with a porous body 8. As illustrated in FIG. 3, the porous body 8 is covered with a porous sheet 9. The porous sheet 9 is in contact with the fuel electrode 5 and the air electrode 6 while being filled in the gas flow channel 3 together with the porous body 8. While the porous body 8 is a foam obtained by foaming an arbitrary material, the porous sheet 9 is a mesh body like a wire net, a punching metal, and the like. More specifically, the porous sheet 9 includes pores formed to spread in a uniform manner. FIGS. 1 to 3 illustrate the example of a wire net made of a metal wire formed in a lattice shape. Accordingly, the diameter of the pores provided in the porous sheet 9 is larger than the diameter of the pores provided in the porous body 8. By providing the porous body 8, the diffusibility of the fuel gas and the air passing through the gas flow channel 3 can be enhanced, so that the reactivity of the fuel gas and the air with each of the electrode 5 and 6 can be enhanced. The diffusibility is not affected by the porous sheet 9 that covers the porous body 8, since the porous sheet 9 have pores large in diameter. The porous sheet 9 is preferably formed with an oxidation-resistant material to prevent the sheet from being oxidized by oxygen in the air.

The porous sheet 9 is formed with a material (for example, metal) high in electrical conductivity. Thus, the porous sheet 9 made of a material having electrical conductivity is provided inside the gas flow channel 3 so as to be in contact with the fuel electrode 5 or the air electrode 6. As a result, the porous sheet 9 functions as a current collector. Accordingly, it becomes possible to form the porous body 8 with materials without a current collecting capability. This reduces the restrictions in selection of a foamed material that forms the porous body used for securing the gas flow channel (the above-described diffusibility) and collecting current. Therefore, a material having a good foamability can be selected, resulting in provision of a highly productive power generator 1. More specifically, as the material of the porous body 8 obtained by foaming, an inexpensive material without oxidation resistance can be used, and the weight of the material can also be minimized. Moreover, since the pores in the porous sheet 9 have a large diameter, circulation of the gas is not disturbed even when the sheet is oxidized. In the example of FIGS. 1 to 3, from the viewpoint of securing a good circularity of the fuel gas or the air, the porous sheet 9 does not cover the front and rear portions of the porous body 8 as viewed in a circulation direction of the fuel gas or the air. However, the porous sheet 9 may also be provided to cover such front and rear portions of the porous body 8.

In the case of the single-chamber type power generator in which fuel gas and air pass through the same gas flow channel 3 as illustrated in FIGS. 1 and 2, both the fuel electrode 5 and the air electrode 6 expose to the same gas flow channel 3. In the case of such a single-chamber type power generator, the porous sheet 9 may include portions made of materials different from each other, the portions being in contact with the fuel electrode 5 and the air electrode 6, respectively. That is, in the case of what is called a single-chamber solid oxide fuel cell, the fuel electrode 5 and the air electrode 6 are exposed to one gas flow channel 3. In such a case, the portions of the porous sheets 9, which are each in contact with the fuel electrode 5 and the air electrode 6, may be made of materials different from each other. This makes it possible to use materials each suitable for being in contact with the electrodes 5 and 6. The materials to be used in this case may be obtained by treating the surface of the porous sheet 9, or by using the porous sheet 9 itself as the materials. When the portion to be in contact with the air electrode 6 is chromalized in particular, oxidation can be decreased in the vicinity of the air electrode 6, which is in an easily oxidized environment, while an influence of chromium on the fuel electrode 5 can be prevented (poisoning of the fuel electrode 5 with chromium can be prevented). The porous sheet 9 may be bonded in advance to the fuel electrode 5 or the air electrode 6 exposed to the gas flow channel 3. By bonding the porous sheet 9 to the fuel electrode 5 or the air electrode 6 in advance, a plurality of fuel cells can be assembled efficiently when the fuel cells are disposed with the porous body being interposed therebetween.

Figure 4:
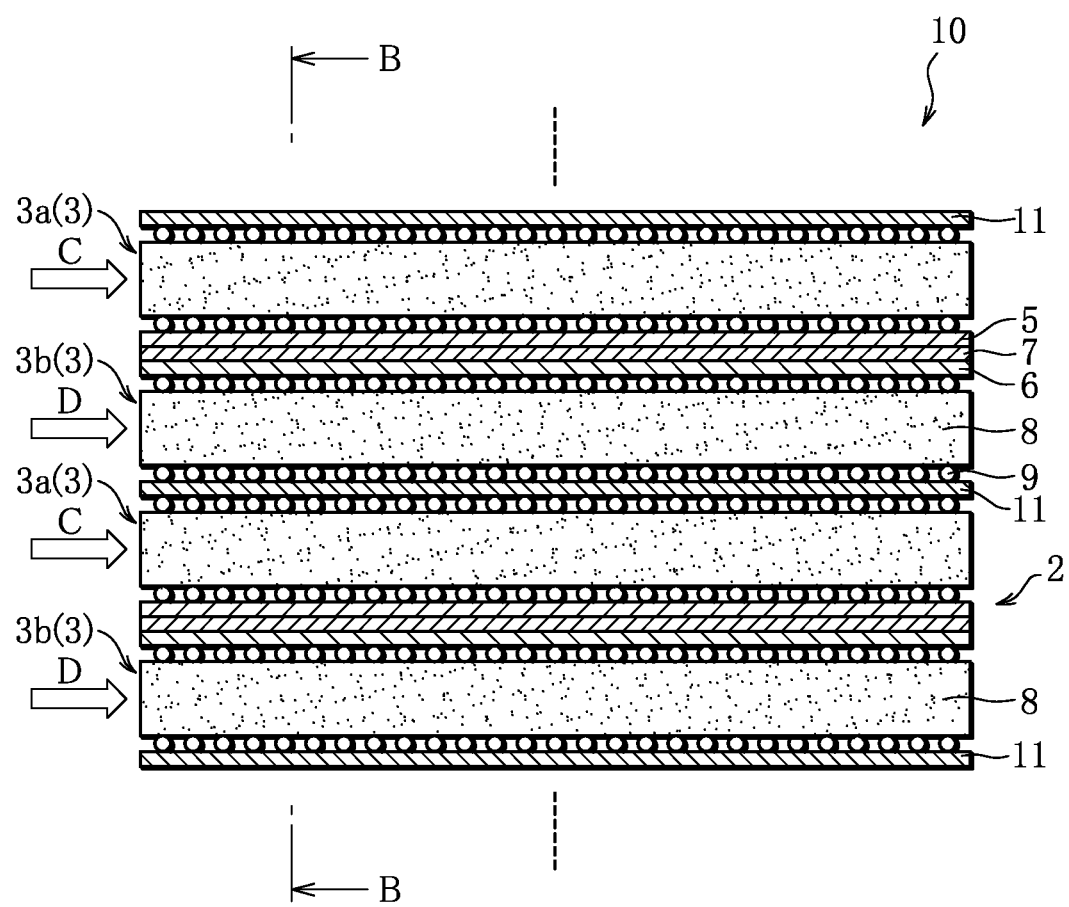
FIG. 4 is a schematic cross sectional view in a longitudinal direction of another power generator according to an embodiment of the present invention.
Figure 5:
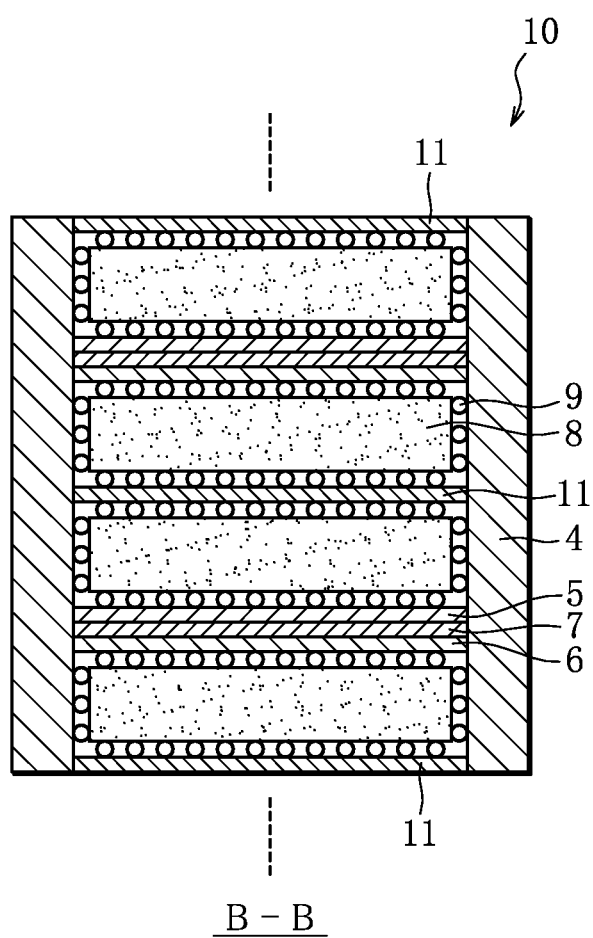
FIG. 5 is a cross sectional view of FIG. 4 taken along B-B line.

FIGS. 4 and 5 illustrate another power generator 10 according to an embodiment of the present invention. The device 10 is a so-called double-chamber type device. More specifically, the fuel cells 2 are apposed at intervals as in the single-chamber type device, but a partition body 11 is present in between the fuel cells. Therefore, the gas flow channel 3 is surrounded and formed with the fuel cell 2, the partition body 11, and the wall 4. Accordingly, only one of the electrodes 5 and 6 of the fuel cell 2 is exposed to one gas flow channel 3. Only fuel gas circulates in a gas flow channel 3a to which only the fuel electrode 5 is exposed (in a direction of arrow C in FIG. 4). Only air circulates in a gas flow channel 3b to which only the air electrode 6 is exposed (in a direction of arrow D in FIG. 4). Even in the thus-structured double-chamber type power generator 10, the effect same as the above-described effect can be achieved by filling the gas flow channel 3 with the porous body 8 covered with the porous sheet 9. Other structural and functional aspects are identical to those in the example of FIGS. 1 and 2.

In order to accomplish the above object and other objects, embodiments of the present invention provide a power generator, including: a fuel electrode that receives a supply of fuel gas; an air electrode that receives a supply of air; an electrolyte layer disposed in between the fuel electrode and the air electrode; a gas flow channel that circulates therein the fuel gas or the air, with the fuel electrode or the air electrode being exposed to at least part of the gas flow channel; a porous body filled in the gas flow channel; and a porous sheet present in contact with the porous body and the fuel electrode or the air electrode, the porous sheet being made of a material having electrical conductivity, the material having pores formed to spread in a uniform manner, the pores being larger in diameter than pores formed in the porous body.

The power generator preferably includes a plurality of fuel cells each formed of the fuel electrode, the air electrode, and the electrolyte layer, wherein the plurality of fuel cells are each provided through the gas flow channel, both the fuel electrode and the air electrode are exposed to the gas flow channel, and the porous sheet includes portions formed with materials different from each other, the portions being in contact with the fuel electrode and the air electrode, respectively.

When the power generator is applied to a so-called single-chamber solid oxide fuel cell, the fuel electrode and the air electrode are exposed to one gas flow channel. In such a case, the portions of the porous sheets, which are each in contact with the fuel electrode and the air electrode, may be formed with materials different from each other. This makes it possible to use materials suitable for being in contact with each of the electrodes. The materials to be used in this case may be obtained by treating the surface of the porous sheet, or by using the porous sheet itself as the materials.

Preferably, only the portion in contact with the air electrode in the porous sheet is chromalized. When the portion to be in contact with the air electrode is chromalized, oxidation can be decreased in the vicinity of the air electrode, which is in an easily oxidized environment, while an influence of chromium on the fuel electrode can be prevented.

EXPLANATION OF REFERENCE SIGNS

1 Power generator
2 Fuel cell
3 Gas flow channel
4 Wall
5 Fuel electrode
6 Air electrode
7 Electrolyte layer
8 Porous body
9 Porous sheet
10 Power generator
11 Partition body

The invention claimed is:

1. A power generator, comprising:
a fuel electrode that receives a supply of fuel gas;
an air electrode that receives a supply of air;
an electrolyte layer disposed in between the fuel electrode and the air electrode;
a gas flow channel that circulates therein the fuel gas or the air, with the fuel electrode or the air electrode being exposed to at least part of the gas flow channel;
a porous body filled in the gas flow channel; and
a porous sheet in contact with the porous body and the fuel electrode or the air electrode, the porous sheet being made of a material having electrical conductivity, the material having pores formed to spread in a uniform manner, the pores being larger in diameter than pores formed in the porous body;
wherein a surface of the porous body is covered with the porous sheet so as to form an electrically conductive path by completely enclosing a cross-sectional area of the gas flow channel.

2. The power generator according to claim 1, comprising:
a plurality of fuel cells each formed of the fuel electrode, the air electrode, and the electrolyte layer, wherein
the plurality of fuel cells are each provided through the gas flow channel, both the fuel electrode and the air electrode are exposed to the gas flow channel, and
the porous sheet includes portions formed with materials different from each other, the portions being in contact with the fuel electrode and the air electrode, respectively.

3. The power generator according to claim 1, wherein only a portion of the porous sheet in contact with the air electrode is chromalized.

* * * * *